United States Patent
Revel et al.

(10) Patent No.: US 12,017,591 B2
(45) Date of Patent: Jun. 25, 2024

(54) TRIM PANEL FOR AN EXTERNAL PILLAR OF A MOTOR VEHICLE AND METHOD FOR MANUFACTURING SUCH A TRIM PANEL

(71) Applicant: NOVARES FRANCE, Clamart (FR)

(72) Inventors: Anthony Revel, Mllieu Loyes Mollon (FR); Guillaume Huguet, Nivigne Et Suran (FR); Emmanuel Prin, Groissiat (FR); David Chenaud, Bellignat (FR)

(73) Assignee: NOVARES FRANCE, Clamart (FR)

( * ) Notice: Subject to any disclaimer, the term of this patent is extended or adjusted under 35 U.S.C. 154(b) by 949 days.

(21) Appl. No.: 16/955,940

(22) PCT Filed: Dec. 12, 2018

(86) PCT No.: PCT/FR2018/053241
§ 371 (c)(1),
(2) Date: Jun. 19, 2020

(87) PCT Pub. No.: WO2019/122615
PCT Pub. Date: Jun. 27, 2019

(65) Prior Publication Data
US 2020/0384931 A1 Dec. 10, 2020

(30) Foreign Application Priority Data
Dec. 22, 2017 (FR) ...................................... 1763161

(51) Int. Cl.
*B60R 13/04* (2006.01)
*B29C 45/14* (2006.01)
(Continued)

(52) U.S. Cl.
CPC ........ *B60R 13/04* (2013.01); *B29C 45/14467* (2013.01); *B60Q 1/2626* (2013.01);
(Continued)

(58) Field of Classification Search
CPC .. B60Q 1/2669; B60Q 1/2696; B60Q 1/5035; B60R 11/0235; B60R 13/04;
(Continued)

(56) References Cited

U.S. PATENT DOCUMENTS 8,998,282 B2 * 4/2015 Gerndorf ................ B60R 25/23
362/546
9,802,554 B1 * 10/2017 Schulze zur Wiesche ..................
B29C 45/0025
(Continued)

FOREIGN PATENT DOCUMENTS

DE 102012002650 A1 8/2013
DE 102015214247 A1 2/2017
(Continued)

OTHER PUBLICATIONS

English translation of DE 10 2015 214 247; retrieved via Patent-Translate located at www.epo.org. (Year: 2023).*
(Continued)

*Primary Examiner* — Jason S Daniels
(74) *Attorney, Agent, or Firm* — CANTOR COLBURN LLP

(57) ABSTRACT

A trim panel for an external pillar of a motor vehicle, including: a first trim element which is formed by a first translucent or transparent material or a material which permits the diffusion of light which has a given wavelength, a second trim element which is formed by a second non-translucent and non-transparent material which does not allow the diffusion of light which has a given wavelength, the second element having an external surface in contact with an internal surface of the first element, the second element further having at least one recess which does not have the second material; an insert which is formed by a third translucent or transparent material or by a material which permits the diffusion of light which has a given
(Continued)

wavelength, the insert comprising a nesting portion which is arranged so as to completely fill the recess of the second element.

20 Claims, 6 Drawing Sheets

(51) Int. Cl.
*B60Q 1/26* (2006.01)
*B60Q 1/50* (2006.01)
*B29K 633/00* (2006.01)
*B29K 655/02* (2006.01)
*B29K 669/00* (2006.01)
*B29K 677/00* (2006.01)
*B29L 31/30* (2006.01)

(52) U.S. Cl.
CPC ............ *B60Q 1/263* (2013.01); *B60Q 1/5035* (2022.05); *B29K 2633/00* (2013.01); *B29K 2655/02* (2013.01); *B29K 2669/00* (2013.01); *B29K 2677/00* (2013.01); *B29K 2995/0026* (2013.01); *B29K 2995/0029* (2013.01); *B29L 2031/3041* (2013.01)

(58) Field of Classification Search
CPC ......... B60R 25/23; B60R 25/24; B62D 25/04; E05B 17/10; F21S 41/50; F21S 41/55
USPC .................................................. 296/1.08, 21
See application file for complete search history.

(56) References Cited

U.S. PATENT DOCUMENTS

| | | | | |
|---|---|---|---|---|
| 10,279,563 | B2* | 5/2019 | Lay | B29C 63/0073 |
| 10,322,754 | B2* | 6/2019 | Salter | B60R 13/04 |
| 2002/0073518 | A1* | 6/2002 | Chesson | B60J 5/0411 |
| | | | | 24/455 |
| 2004/0090767 | A1* | 5/2004 | Hou | B60Q 1/323 |
| | | | | 362/540 |
| 2005/0169002 | A1* | 8/2005 | Steen | F21S 43/237 |
| | | | | 362/487 |
| 2009/0160529 | A1* | 6/2009 | Lamborghini | B60K 37/06 |
| | | | | 200/600 |
| 2010/0296303 | A1* | 11/2010 | Sarioglu | E05B 17/10 |
| | | | | 362/487 |
| 2012/0032463 | A1* | 2/2012 | Gerndorf | B60R 13/025 |
| | | | | 296/1.08 |
| 2017/0018129 | A1* | 1/2017 | Huebner | B60K 35/00 |

FOREIGN PATENT DOCUMENTS

| | | | | |
|---|---|---|---|---|
| EP | 2793062 | A1 | 10/2014 | |
| GB | 2426344 | A * | 11/2006 | ........... G07C 9/0069 |

OTHER PUBLICATIONS

English Translation to International Search Report for Application No. PCT/FR2018/053241.
International Search Report for Application No. PCT/FR2018/053241.
Written Opinion for Application No. PCT/FR2018/053241.

* cited by examiner

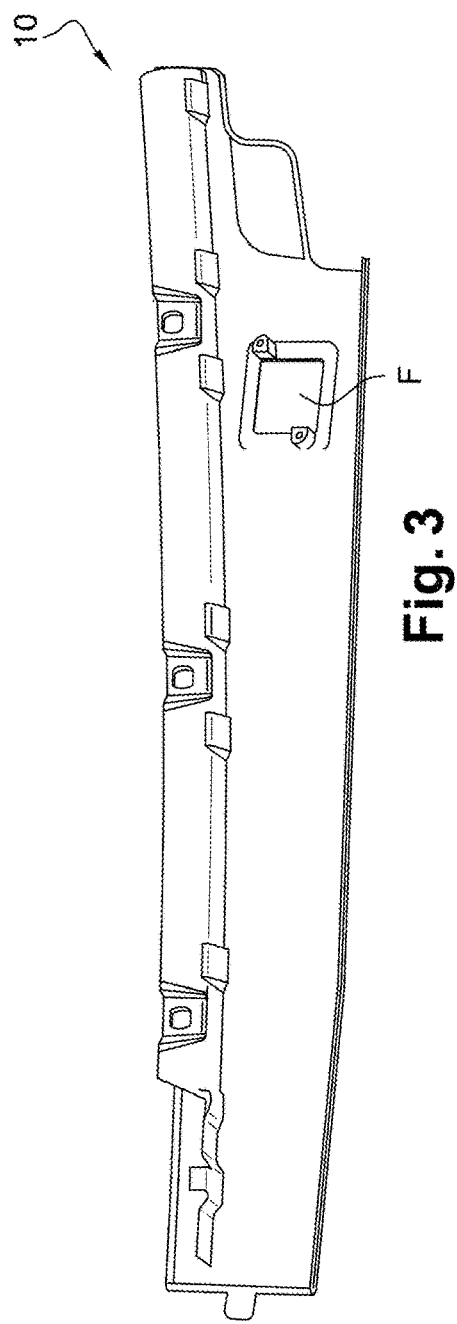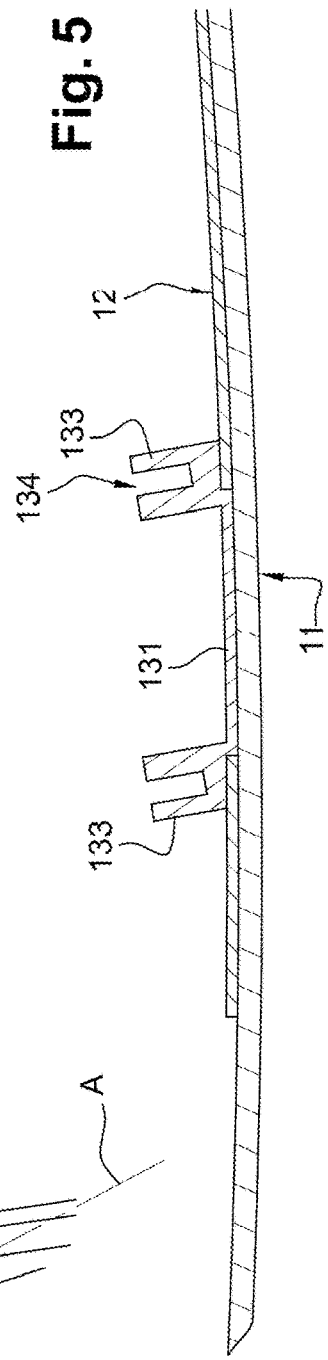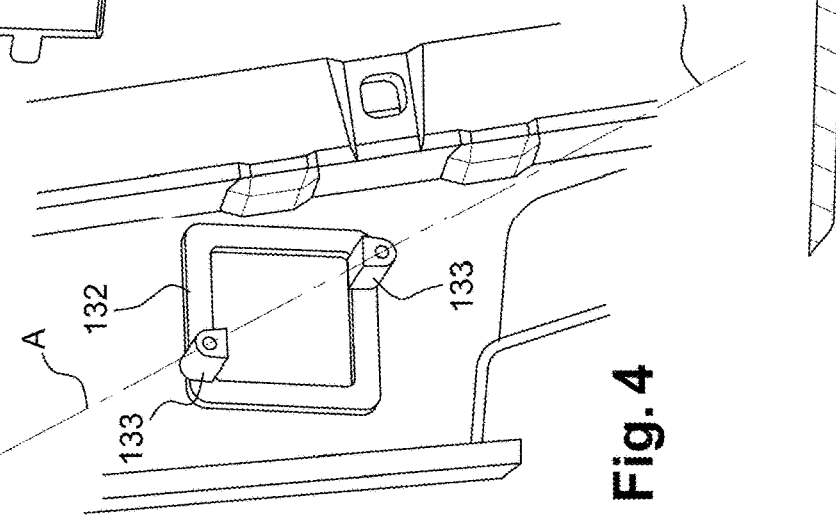

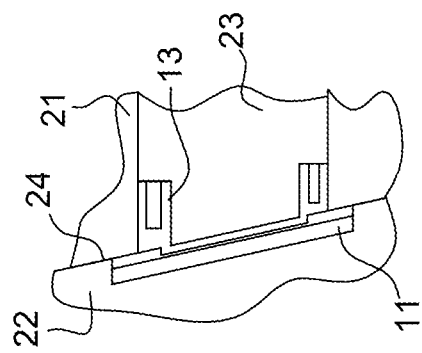
Fig. 6C
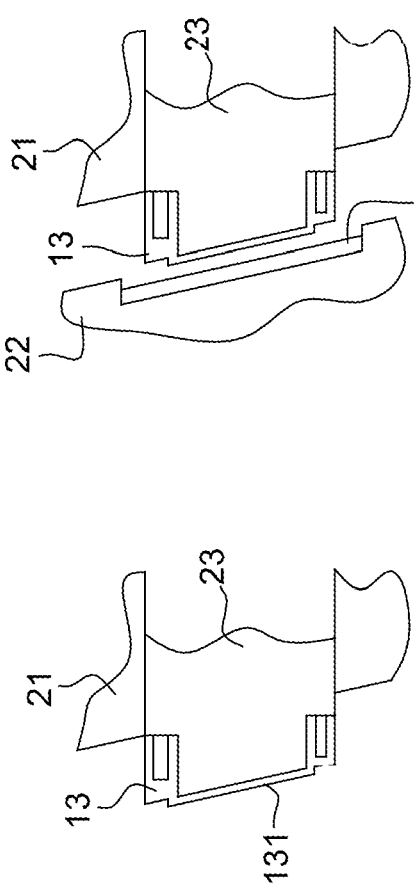
Fig. 6A
Fig. 6B
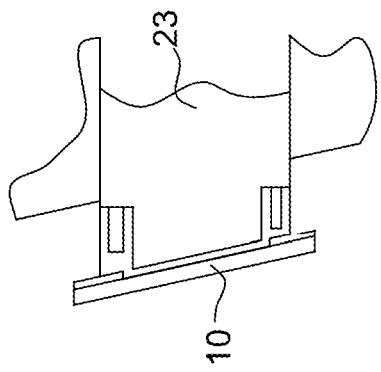
Fig. 6F
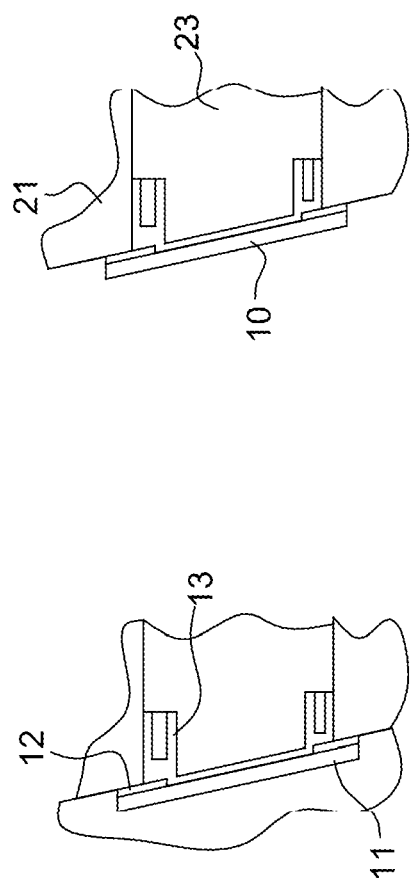
Fig. 6D
Fig. 6E

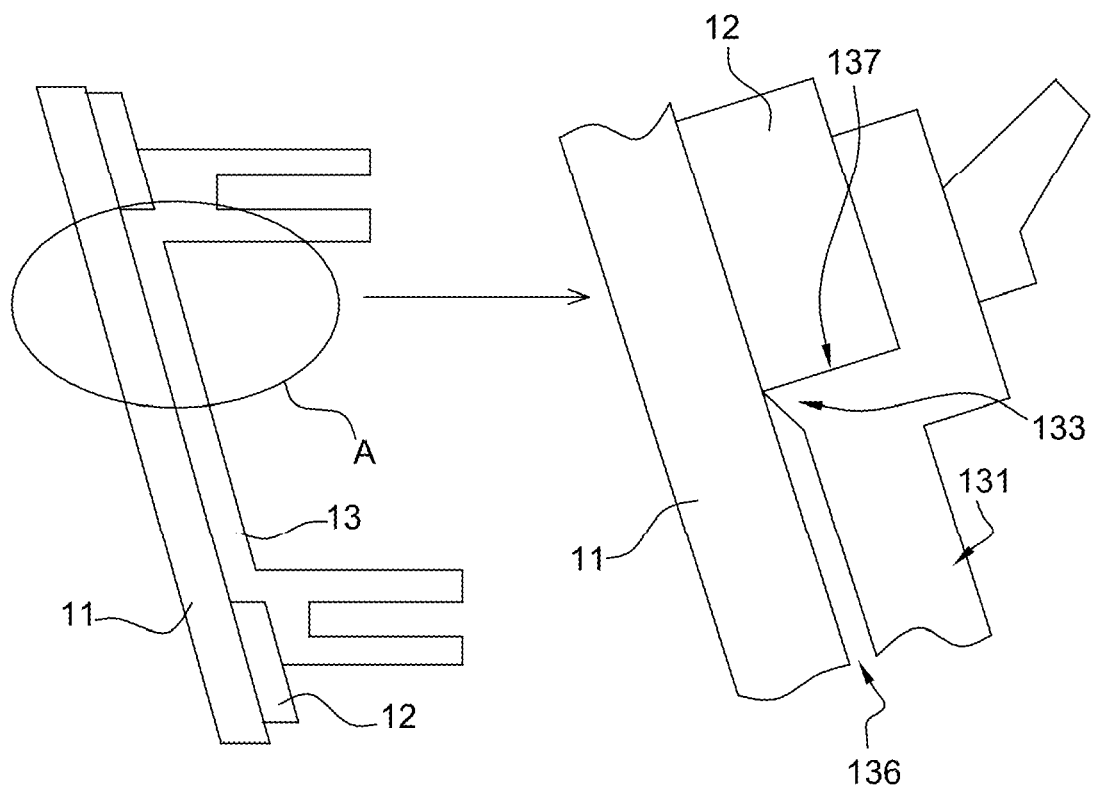

TRIM PANEL FOR AN EXTERNAL PILLAR OF A MOTOR VEHICLE AND METHOD FOR MANUFACTURING SUCH A TRIM PANEL

CROSS REFERENCE TO RELATED APPLICATIONS

This application is a National Stage of PCT Application No. PCT/FR2018/053241 filed on Dec. 12, 2018, which claims priority to French Patent Application No. 1763161 filed on Dec. 22, 2017, the contents each of which are incorporated herein by reference thereto.

TECHNICAL FIELD

The present invention concerns a trim panel for an external pillar of a motor vehicle.

The present invention also concerns a method for manufacturing such a trim panel.

BACKGROUND

It is known in the prior art to equip the external pillars of a motor vehicle with trim panels having a display or ornamental function. In particular, the external pillars comprise the body center pillars, the door pillars, the windshield pillars, the front or rear wheel arches. These trim panels are generally formed by a substantially translucent or transparent first material and by a non-translucent and non-transparent second material. The first element is disposed over a visible outer portion of the panel and fulfills an ornamental function. The second element is arranged under the first element and fulfills mechanical functions, in particular a function of fixing with the rest of the body. This trim panel type is generally manufactured through a two-component injection molding process.

The material used for these two components is generally different.

One of the recent improvements in these trim panels has been to form a recess inside the non-translucent and non-transparent second element and to fix an electronic display module on said second element at the level of said recess. Thus, the display output by the electronic module is visible by transparency through the first element of the panel.

However, during the manufacture of such improved trim panels, several technical problems have arisen. One problem consists in the apparition of surface defects because of the difference in shrinkage between the first element and the second element at the level of the recess but also because of the use of different materials. This difference in shrinkage thus confers a ripple effect over the portion of the first element that is located directly above the recess. A second problem is the difference in mechanical inertia within the first element itself because of the variation of thickness generated by the recess. This difference in mechanical inertia increases the ripple effect even more. Finally, a last problem is the direct contact of the constitutive material of the first element with the constitutive portions of the mold at the level of the recess. This direct contact generates local stresses in the first element, in particular because the constitutive material is still hot at the time of contact.

BRIEF SUMMARY

Therefore, the invention aims to solve the above-mentioned problems.

To this end, an object of the invention is a trim panel for an external pillar of a motor vehicle, comprising:

A first trim element formed by a first material which is translucent or transparent or enabling the diffusion of light at a determined wavelength, said first element having an outer surface oriented outwardly of the vehicle and an inner surface oriented inwardly of the vehicle;

A second trim element formed by a second material which is non-translucent or non-transparent or not enabling the diffusion of light at a determined wavelength, said second element having an outer surface in contact with the inner surface of the first element, said second element further having at least one recess which is devoid of the second material;

An insert formed by a third material which is translucent or transparent or enabling the diffusion of light at a determined wavelength, said insert comprising an interlocking portion arranged so as to completely fill the recess of the second element.

Thus, the first element and/or the insert may be opaque in the visible range, but transparent to laser or infrared waves.

Thus configured, the trim panel will no longer have surface defects at the level of the outer translucent trim element because of the presence of the insert, which fills the recess during the manufacture of the panel. Thus positioned, the insert prevents, on the one hand, the phenomenon of more significant shrinkage of the constitutive material of the non-translucent trim element inside the recess, and permits, on the other hand, to rigidify the panel, a continuity of mechanical inertia being ensured by the insert at the level of the recess. Finally, the insert avoids the constitutive material of the outer trim element from being in direct contact with the constitutive portions of the mold.

In a particular configuration of the invention, the insert is provided on an inner face oriented inwardly of the vehicle with fastening means configured to enable fastening of an accessory module.

In a particular configuration of the invention, the fastening means comprise lugs projecting from the inner face of the insert, said lugs having a bore enabling screwing of the accessory module on the insert.

In another particular configuration of the invention, the fastening means are selected from clips and snaps for snap-riveting.

In a particular configuration of the invention, the accessory module comprises a NFC chip.

In a particular configuration of the invention, the accessory module comprises a lighting element.

In a particular configuration of the invention, the insert is provided on an outer face with a technical element attached or structured on said outer face.

In a particular configuration of the invention, the technical element is deposited over the outer face of the insert by a method selected from chromium electrolytic deposition, hot printing, laser engraving, 3D-MID technology, vacuum metallization and inkjet printing.

In a particular configuration of the invention, the technical element defines an electronic module or a heating element.

In a particular configuration of the invention, the first material used for making the first element is selected from poly(methyl methacrylate) and polycarbonate.

In a particular configuration of the invention, the second material for making the second element is selected from acrylonitrile butadiene styrene and polycarbonate.

In a particular configuration of the invention, the third material used for making the insert is selected from poly (methyl methacrylate), polycarbonate and polyamide.

Another object of the invention is a method for manufacturing a trim panel for an external pillar of a motor vehicle, comprising the steps of:

a) Providing an insert formed by a material which is translucent or transparent or enabling the diffusion of light at a determined wavelength, said insert comprising an interlocking portion, b) Providing a first trim element formed by a material which is translucent or transparent or enabling the diffusion of light at a determined wavelength, c) Assembling the first trim element with the insert such that an inner surface of the first trim element is in contact at least locally with the interlocking portion of the insert, d) Disposing the assembly formed at step c) within an injection mold, e) Closing the mold, said assembly being positioned within the mold so as to leave at least one inner cavity devoid of any material, f) Injecting a material which is non-translucent and non-transparent or not enabling the diffusion of light at a determined wavelength into said inner cavity so as to form a second trim element, g) Opening the mold, h) Ejecting the trim panel thus formed.

In a particular configuration of the method of the invention, the injection mold is formed by a fixed first portion and a movable second portion and steps c), d) and e) are carried out simultaneously, when the second portion of the injection mold containing the first trim element is displaced until joining the first portion of the injection mold containing the insert, thereby closing the injection mold, the insert then being in contact with the first trim element only along the peripheral edges of the interlocking portion.

In a particular configuration of the method of the invention, steps b) and c) are carried out simultaneously by overmolding of the first trim element over the insert within an injection mold.

In a particular configuration of the method of the invention, the injection mold is equipped with a movable presser configured to adjust the pressure applied on the first trim element during step e).

BRIEF DESCRIPTION OF THE DRAWINGS

Other features and advantages will clearly come out from the description hereinafter of one embodiment of a trim panel according to the invention, provided as a non-limiting example, and of two methods for manufacturing such a trim panel, with reference to the appended drawings in which:

FIG. 3 is a perspective view of a trim panel according to the invention, once molded;

FIG. 4 is an enlarged view of the insert which is visible on the panel illustrated in FIG. 3;

FIG. 5 is a sectional view according to the oblique plane AA of FIG. 4;

FIGS. 6A to 6F schematically illustrate the successive steps of a first variant of a manufacturing method for producing a trim panel according to the invention;

FIG. 8 is a view similar to FIG. 5 in the case where the panel is manufactured according to the method of FIGS. 6A to 6F; and FIG. 8A is an enlarged view of the detail A of FIG. 8.

DETAILED DESCRIPTION

Figure 1:
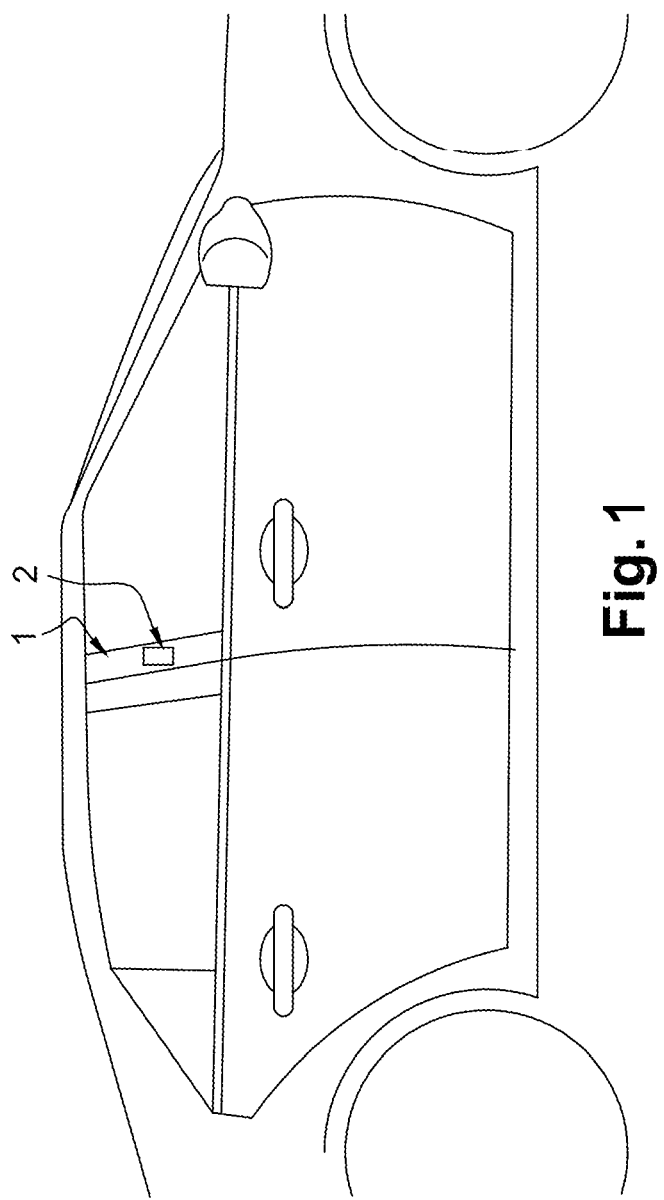
FIG. 1 illustrates a motor vehicle provided with a trim panel according to the invention.

The motor vehicle illustrated in FIG. 1 comprises a trim element for an external pillar 1 provided with a display element 2 intended to display information that are visible from outside the vehicle. This display element 2 is in fact disposed beneath the trim panel in which a translucent or transparent window has been disposed in alignment with the display element 2 so as to make the information displayed by said display element 2 visible.

Referring to FIG. 3, there is represented an example of a trim panel according to the invention that may be used in the vehicle of FIG. 1 so as to make information displayed by the display element 2 visible. In particular, this panel 10 is formed by a translucent or transparent window F through which the information broadcast by the display element 2 can be seen from outside the vehicle.

Figure 2:
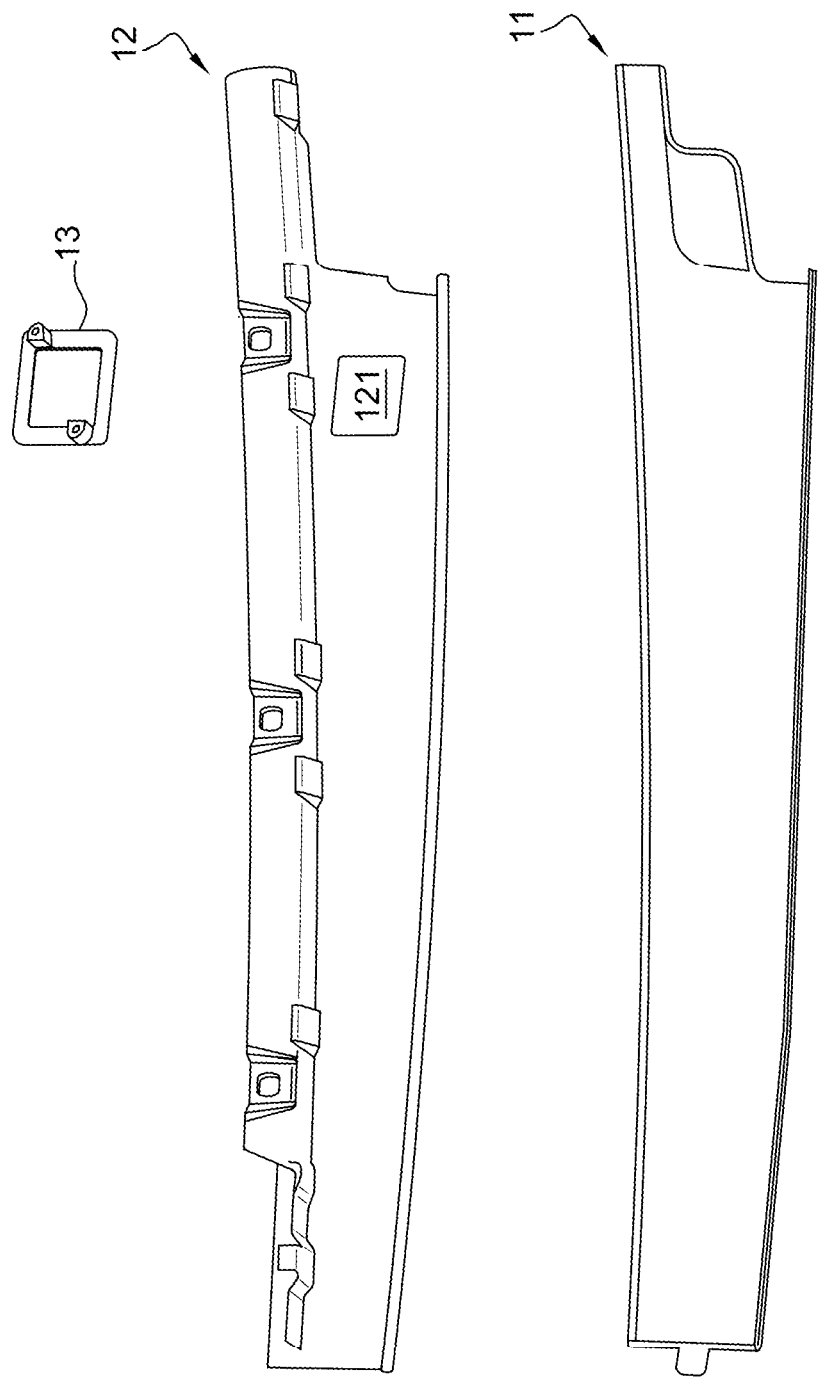
FIG. 2 is an exploded and perspective view of various constitutive elements of a trim panel according to the invention.
Figure 7A:
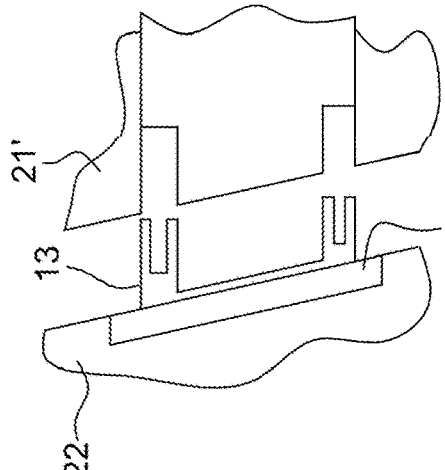
FIGS. 7A to 7F schematically illustrate the successive steps of a second variant of a manufacturing method for producing a trim panel according to the invention.
Figure 7B:
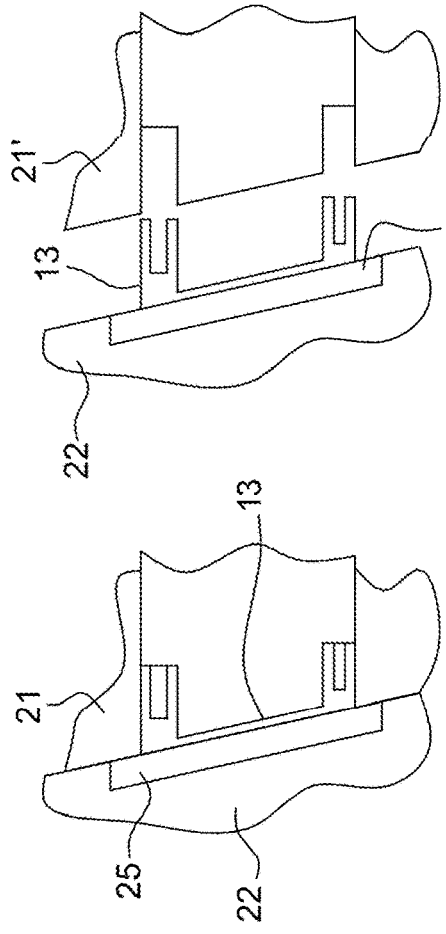
Figure 7C:
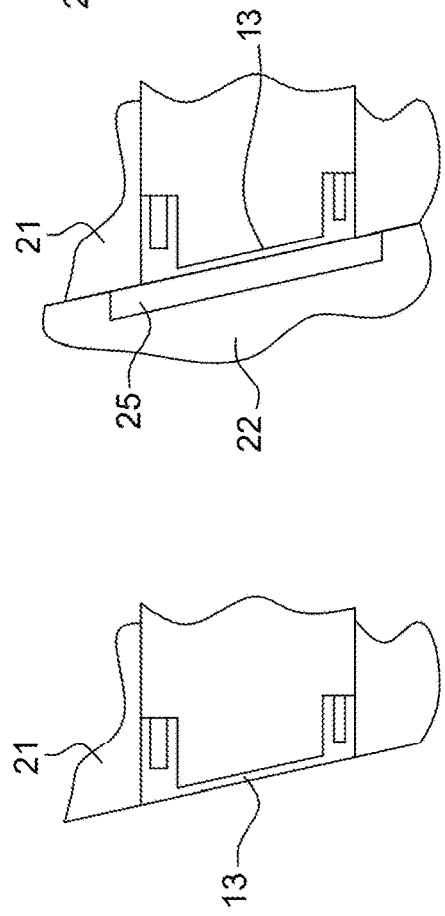
Figure 7D:
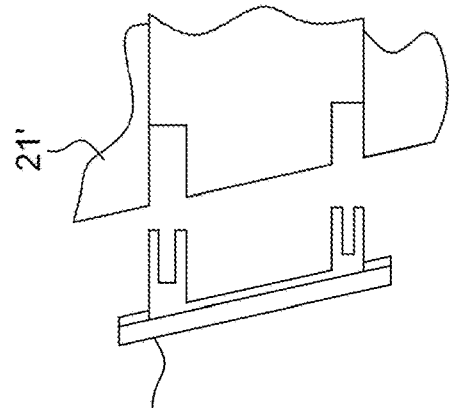
Figure 7E:
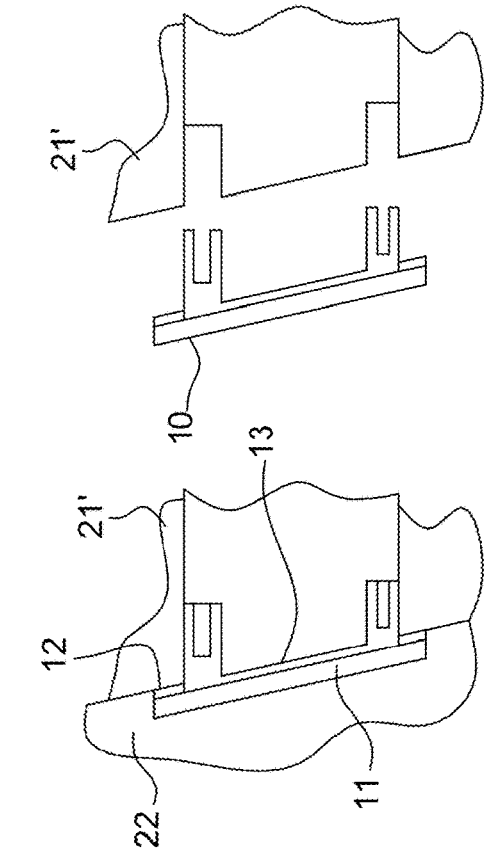
Figure 7F:
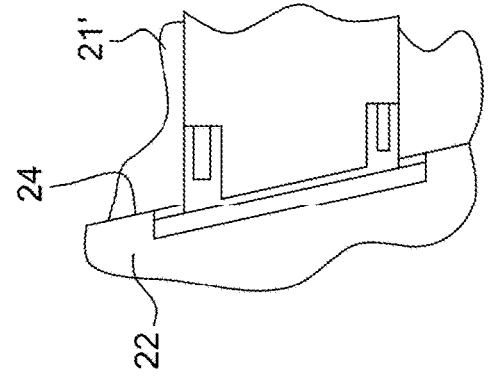

Referring to FIG. 2, the main constitutive elements of the panel of FIG. 3 are shown. Thus, the panel 10 comprises a first completely translucent or transparent trim element 11. Preferably, this first element 11 will be made of PMMA (Poly(methyl methacrylate)) or PC (Polycarbonate). It will further have at least one shiny, continuous and smooth surface. The panel 10 also comprises a second non-translucent and non-transparent trim element 12. This second element 12 will preferably be made of an opaque material having improved mechanical characteristics, for example ABS (acrylonitrile butadiene styrene) or PC (Polycarbonate). This second element 12 is positioned behind the first element 11, which forms the visible outer portion of the panel 10. The second element 12 has a substantially rectangular shaped recess 121. Hence, the recess is devoid of the non-translucent and non-transparent material. Hence, it partially defines the window F of the panel 10. Finally, the panel 10 comprises an insert 13 made of a translucent or transparent material, such as for example PMMA or PC (polycarbonate).

As illustrated in detail in FIGS. 4 and 5, the insert 13 comprises an interlocking portion 131 having a shape complementary to that of the recess 121 such that, in the final molded panel, it completely fills the recess 121. This interlocking portion 131 will therefore prevent the constitutive material of the second element 12 from undergoing a shrinkage that is more significant at the level of the recess 121 than the constitutive material of the first element 11, during the overmolding of the second element 12 over the first element 11. It will also permit to rigidify the panel 10 since the empty space formerly defined by the recess 121 is filled by said interlocking portion 131. Furthermore, the insert 13 has a peripheral edge 132 surrounding the interlocking portion 131 and positioned slightly recessed towards the interior of the vehicle, said edge 132 resting on an inner face of the second element 12. Lugs 133, each provided with a bore 134, project inwardly from this peripheral edge 132. Thus, these bores 134 will allow an accessory module (not shown) to be screwed onto the insert 13. The lugs 133 may be replaced by clips, snaps for snap-riveting or any other type of fasteners. In particular, such an accessory module may comprise a screen, a capacitive surface, a camera, a radar, a fingerprint/retinal pattern scanner, a haptic feedback system, a NFC or Bluetooth chip, a lighting element, a heating element. It is also possible to consider providing an outer face of the insert 13 with a technical element such as an ornamentation or electronic element, said technical element may be deposited over the outer face of the insert by a method selected from chromium electrolytic deposition, hot printing, laser engraving, 3D-MID, vacuum metallization, technical film overmolding, pad printing and inkjet printing or else achieved by structuring the material. Thus, the insert 13 may carry itself the display elements such as a NFC chip, a lighting element and a heating element. In this configuration, the insert 13 may possibly be made of another technical material such as for example a translucent or non-translucent polyamide.

Referring to FIGS. 6A to 6F, there are represented the successive steps of a first variant of a manufacturing method for producing a trim panel according to the invention.

In this first variant, the insert 13 comprising the interlocking portion 131 is first disposed (cf. FIG. 6A) inside a fixed portion 21 of an injection mold. In a second step (cf. FIG. 6B), the first trim element 11 is disposed inside a movable portion 22 of the injection mold, said first element 11 being disposed opposite the interlocking portion 131 of the insert 13. Prior to this second step, the first element 11 will have been made by injection molding and, preferably, using a rotary injection mold having several imprints, one of the imprints corresponding to the fixed portion 21. In a third step (cf. FIG. 6C), the movable portion 22 of the mold is displaced until joining the fixed portion 21 of the mold, thereby closing the injection mold. The insert 13 is then in contact with both the element 11 and a movable presser 23 on its inner face, said presser allowing applying an adjustable pressure between the insert 13 and the element 11. An inner cavity 24 free of any material is then formed inside the mold, said cavity 24 having substantially the peripheral shape of the second trim element 12. It should be noted that, in this variant, the insert 13 is not welded to the first element 11, but only bears thereon. One of the advantages of this variant is to limit the risks of degradation of the possible technical elements mentioned hereinbefore and supported by the outer face of the insert 13. An clever way to make the insert 13 permitting to limit the risks of infiltration of the second material between the insert 13 and the first element 11 is represented in FIG. 8A. This manner has several advantages. On the one hand, the insert 13 is in contact with the first element 11 only along the peripheral edges 135 of the interlocking portion 131. Hence, an air gap 136 may exist between the first element 11 and the insert 13. On the other hand, the insert 13 has an oblique edge 137 in contact with the second material such that the pressure exerted by the second material tends to press the peripheral edges 135 of the interlocking portion 131 against the first element 11. In the next step (cf. FIG. 6D), the constitutive material of the second element 12 is injected into the inner cavity 24 of the mold. Thereafter (cf. FIG. 6E), the movable portion 22 of the mold is separated from the fixed portion 21 and the panel 10 thus formed is ejected from the fixed portion 21 of the mold by means of the movable presser 23 (cf. FIG. 6F).

Referring to FIGS. 7A to 7F, there are represented the successive steps of a second variant of a manufacturing method for producing a trim panel according to the invention.

In this second variant, the insert 13 comprising the interlocking portion 131 is first disposed (cf. FIG. 7A) inside a fixed portion 21 of an injection mold. In a second step (cf. FIG. 7B), a movable portion 22 of the mold is displaced until joining the fixed portion 21 of the mold, thereby closing the injection mold. An inner cavity 25 free of any material is then formed inside the mold, said cavity 25 having substantially the peripheral shape of the first trim element 11. In the next step (not shown), the constitutive material of the first element 11 is injected into the inner cavity 25 of the mold. Thereafter, the movable portion 22 of the mold is separated from the fixed portion 21 and the assembly thus formed by the first trim element 11 and the insert 13 remains inside the movable portion 22 of the mold. At the next step (cf. FIG. 7C), the movable portion 22 of the mold is displaced opposite another fixed portion 21' of another mold, or of the same mold in the case of a rotary mold with several imprints, and is then displaced until joining said fixed portion 21', thereby closing the injection mold (cf. FIG. 7D). An inner cavity 24 free of any material is then formed inside the mold, said cavity 24 having substantially the peripheral shape of the second trim element 12. In the next step (cf. FIG. 7E), the constitutive material of the second element 12 is injected into the inner cavity 24 of the mold. Thereafter, the movable portion 22 of the mold is separated from the fixed portion 21' and the panel 10 thus formed is ejected from the fixed portion 21' of the mold (cf. FIG. 7F).

Of course, the invention is not limited to the above-described embodiment, this embodiment having been provided only as example. Modifications are possible, in particular with regards to the position of the trim panel on the vehicle, the trim panel may apply on any trim element for an external pillar of a motor vehicle, such as a center pillar, a door pillar, a windshield pillar, a front or rear wheel arch, or a hatchback trim, as well as with regards to the constitution of the various elements, and by substitution with technical equivalents, yet without departing from the scope of the invention.

The invention claimed is:

1. A trim panel for an external pillar of a motor vehicle, comprising:
   a first trim element formed by a first material which is translucent or transparent or enabling diffusion of light at a determined wavelength, the first element having an outer surface oriented outwardly of the vehicle and an inner surface oriented inwardly of the vehicle;
   a second trim element formed by a second material which is non-translucent or non-transparent or not enabling the diffusion of light at a determined wavelength, the second element having an outer surface in contact with the inner surface of the first element, the second element further having at least one recess which is devoid of the second material;
   an insert formed by a third material which is translucent or transparent or enabling the diffusion of light at a determined wavelength, the insert comprising an interlocking portion arranged so as to completely fill the recess of the second element.

2. The trim panel according to claim 1, wherein the insert is provided on an inner face oriented inwardly of the vehicle with fastening means configured to enable fastening of an accessory module.

3. The trim panel according to claim 2, wherein the fastening means comprise lugs projecting from the inner face of the insert, the lugs having a bore enabling screwing of the accessory module on the insert.

4. The trim panel according to claim 2, wherein the fastening means are selected from clips and snaps for snap-riveting.

5. The trim panel according to claim 2, wherein the accessory module comprises a NFC chip.

6. The trim panel according to claim 2, wherein the accessory module comprises a lighting element.

7. The trim panel according to claim 1, wherein the insert is provided on an outer face with a technical element attached or structured on the outer face.

8. The trim panel according to claim 7, wherein the technical element is deposited over the outer face of the insert by a method selected from chromium electrolytic deposition, hot printing, laser engraving, 3D-MID technology, vacuum metallization and inkjet printing.

9. The trim panel according to claim 7, wherein the technical element defines an electronic module or a heating element.

10. The trim panel according to claim 1, wherein the first material is selected from poly(methyl methacrylate) and polycarbonate.

11. The trim panel according to claim 1, wherein the second material is selected from acrylonitrile butadiene styrene and polycarbonate.

12. The trim panel according to claim 1, wherein the third material is selected from poly(methyl methacrylate), polycarbonate and polyamide.

13. A method for manufacturing a trim panel for an external pillar of a motor vehicle, comprising the steps of:
   a) providing an insert formed by a material which is translucent or transparent or enabling diffusion of light at a determined wavelength, the insert comprising an interlocking portion,
   b) providing a first trim element formed by a material which is translucent or transparent or enabling diffusion of light at a determined wavelength,
   c) assembling the first trim element with the insert such that an inner surface of the first trim element is in contact at least locally with the interlocking portion of the insert,
   d) disposing the assembly formed at step c) within an injection mold,
   e) closing the mold, the assembly formed at step c) being positioned within the mold so as to leave at least one inner cavity devoid of any material,
   f) injecting a material which is non-translucent and non-transparent or not enabling the diffusion of light at a determined wavelength into the at least one inner cavity so as to form a second trim element,
   g) opening the mold, and
   h) ejecting the trim panel thus formed.

14. The manufacturing method according to claim 13, wherein the injection mold is formed by a fixed first portion and a movable second portion and wherein steps c), d) and e) are carried out simultaneously, when the second portion of the injection mold containing the first trim element is displaced until joining the first portion of the injection mold containing the insert, thereby closing the injection mold, the insert then being in contact with the first trim element only along peripheral edges of the interlocking portion.

15. The manufacturing method according to claim 13, wherein steps b) and c) are carried out simultaneously by overmolding of the first trim element over the insert within an injection mold.

16. The manufacturing method according to claim 14, wherein the injection mold is equipped with a movable presser configured to adjust pressure applied on the first trim element during step e).

17. The trim panel according to claim 3, wherein the accessory module comprises a NFC chip.

18. The trim panel according to claim 17, wherein the accessory module comprises a lighting element.

19. The trim panel according to claim 18, wherein the insert is provided on an outer face with a technical element attached or structured on the outer face.

20. The trim panel according to claim 19, wherein the technical element is deposited over the outer face of the insert by a method selected from chromium electrolytic deposition, hot printing, laser engraving, 3D-MID technology, vacuum metallization and inkjet printing.

* * * * *